United States Patent [19]
Elton

[11] Patent Number: 5,294,175
[45] Date of Patent: Mar. 15, 1994

[54] VEHICLE SEAT ASSEMBLY WITH A FRONT PANEL

[75] Inventor: Robert D. Elton, Ann Arbor, Mich.

[73] Assignee: Hoover Universal, Inc., Plymouth, Mich.

[21] Appl. No.: 978,746

[22] Filed: Nov. 19, 1992

[51] Int. Cl.⁵ .............................................. B60N 2/42
[52] U.S. Cl. ............................... 297/216.1; 297/423.31
[58] Field of Search ............... 297/216, 433, 434, 435, 297/436; 296/63, 65.1, 68.1

[56] References Cited

U.S. PATENT DOCUMENTS

| | | | |
|---|---|---|---|
| 2,833,338 | 5/1958 | Fidel | 297/434 |
| 2,918,964 | 12/1959 | Braun | 297/434 |
| 4,509,795 | 4/1985 | Brennan et al. | 297/434 |
| 4,819,987 | 4/1989 | Stringer | 297/434 |
| 4,993,776 | 2/1991 | Acuto et al. | 297/216 |

Primary Examiner—Laurie K. Cranmer
Attorney, Agent, or Firm—Harness, Dickey & Pierce

[57] ABSTRACT

A vehicle seat assembly with an extendable front panel is provided to increase the effective length of a vehicle seat cushion. The panel is deployed from a stowed position to a forwardly extending position in response to a predetermined deceleration occurring during a front impact collision of the vehicle. By extending the effective length of the seat cushion, a seat occupant will be prevented from falling to the vehicle floor forward of the seat cushion where additional injuries can be incurred.

21 Claims, 4 Drawing Sheets

VEHICLE SEAT ASSEMBLY WITH A FRONT PANEL

BACKGROUND AND SUMMARY OF THE INVENTION

The present invention relates to a vehicle seat assembly and in particular to a seat assembly with a front panel to automatically extend the effective length of the vehicle seat cushion in the event of an accident.

Current automobile design standards require that the vehicle contain features to protect unbelted occupants as well as belted occupants. The most well known features to protect an occupant are airbags and automatic belt systems. The airbags or automatic belts are used to restrain the upper torso of a vehicle occupant. The lower torso of an occupant is restrained by knee bolsters in the vehicle instrument panel. However, for the bolsters to be effective, the knees of the occupant must be fairly close to the bolsters before the vehicle collision.

Since the driver's seat must be adjusted to a position that enables the driver to reach the vehicle control pedals, the driver's knees will be positioned fairly close to the instrument panel knee bolsters. However, for occupants seated in the passenger seat of the vehicle, it is not uncommon for the seat to be adjusted too far rearwardly for the knee bolsters to be effective in preventing the occupant from moving forward, off the seat cushion during a frontal impact collision. Without restraint to prevent a seat occupant from moving forward, the occupant can move forward, off the seat cushion. With the legs bent at the knees, the occupant's torso will then fall to the floor forward of the seat cushion between the instrument panel, the airbag (if the vehicle is so equipped) and the front edge of the seat cushion. This can cause severe back injuries as well as facial and head injuries.

It is an object of the present invention to provide a support panel for extension from the front of the seat cushion, during a front impact collision, to increase the effective length of the seat cushion and thereby prevent an unbelted occupant from falling down in front of the seat cushion.

It is a feature of the present invention to provide a panel which is rotatably mounted at the front of the seat cushion and stored in a position where the panel forms the front of the seat cushion. During a frontal impact resulting in a deceleration of the vehicle greater than a predetermined level, the panel is automatically deployed to a support position extending forward from the seat cushion. The panel is automatically locked in place to support a seat occupant who has moved forward, onto the panel. Before the occupant can slide forward off the panel, the occupant's knees will strike the knee bolster. This prevents the occupant from dropping down in front of the seat cushion and prevents injuries resulting therefrom. A bias spring urges the support panel to the deployed position. An inertia release latch holds the support panel in its stowed position until the seat experiences the predetermined deceleration necessary to deploy the panel.

Further objects, features and advantages of the invention will become apparent from a consideration of the following description and the appended claims when taken in connection with the accompanying drawings.

DETAILED DESCRIPTION OF THE INVENTION

Figure 1:
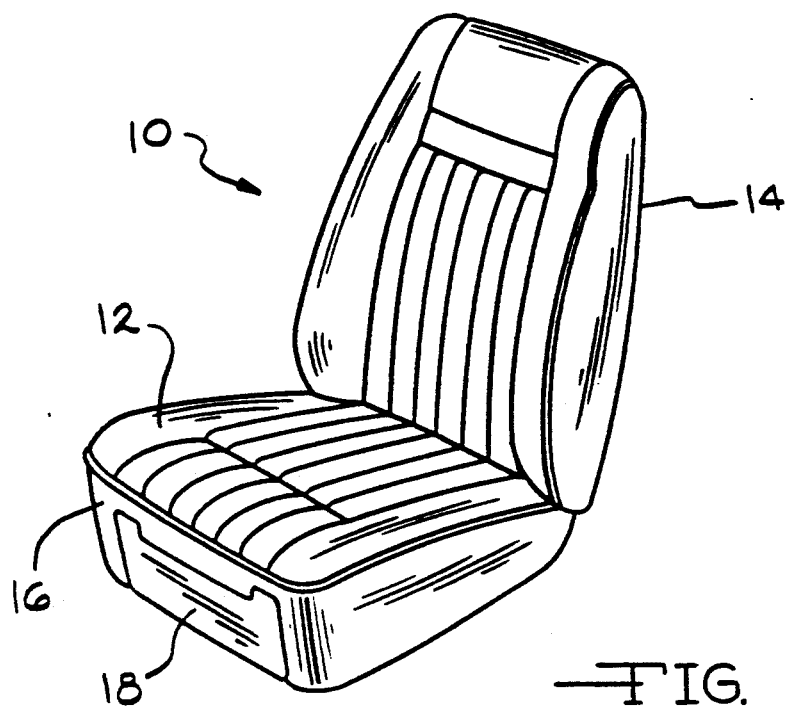
FIG. 1 is a perspective view of the seat assembly of the present invention containing a panel at the front of the seat cushion shown in a stowed position.
Figure 2:
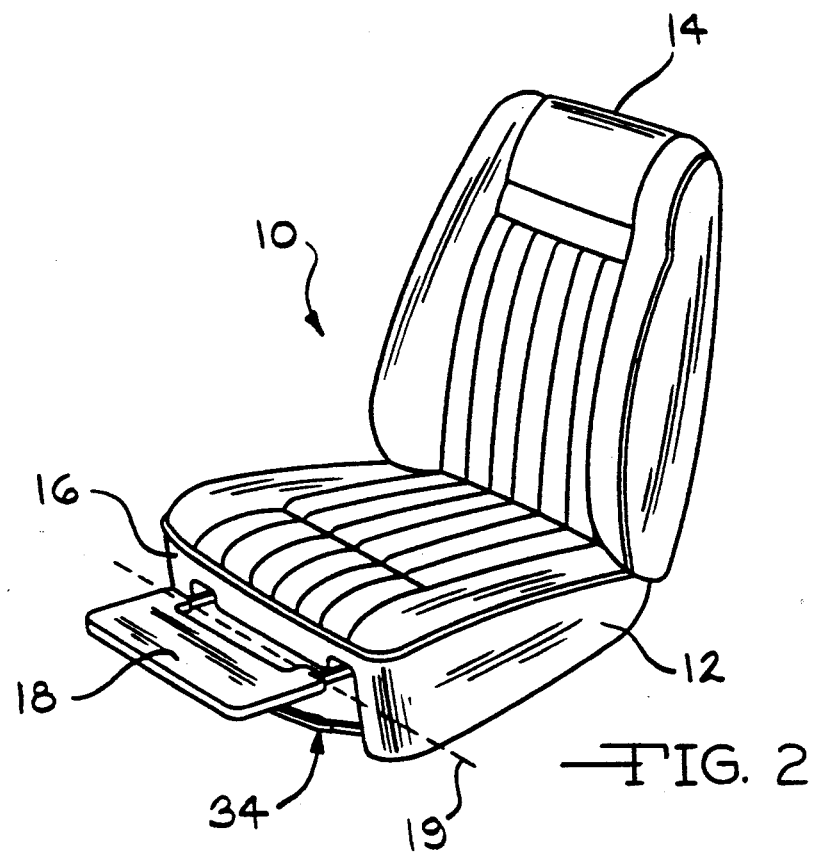
FIG. 2 is a perspective view of the seat assembly in FIG. 1 showing the panel in a forwardly extending deployed position.

The seat assembly of the present invention, containing a front panel, is disclosed in FIG. 1 and designated generally at 10. Seat assembly 10 includes a lower seat cushion 12 which is generally horizontal and a seat back 14 extending upwardly at the rear of the seat cushion. The front end 16 of the seat cushion includes a panel 18 which is shown in FIG. 1 in an upright stowed position forming the front face of a seat cushion. The seat assembly 10 is shown in FIG. 2, with the panel rotated to a deployed or support position in which it extends forwardly from the front end of the seat cushion. To reach the deployed position, the panel is rotated about the transverse axis 19 at the front of the seat cushion. In the deployed support position, the panel 18 will support the weight of a seat occupant who has moved forward, off of the seat cushion 12, in response to the deceleration of the vehicle and seat assembly during a front impact vehicle collision. This prevents an unrestrained occupant from falling to the vehicle floor forward of the seat cushion and receiving additional injuries.

Figure 3:
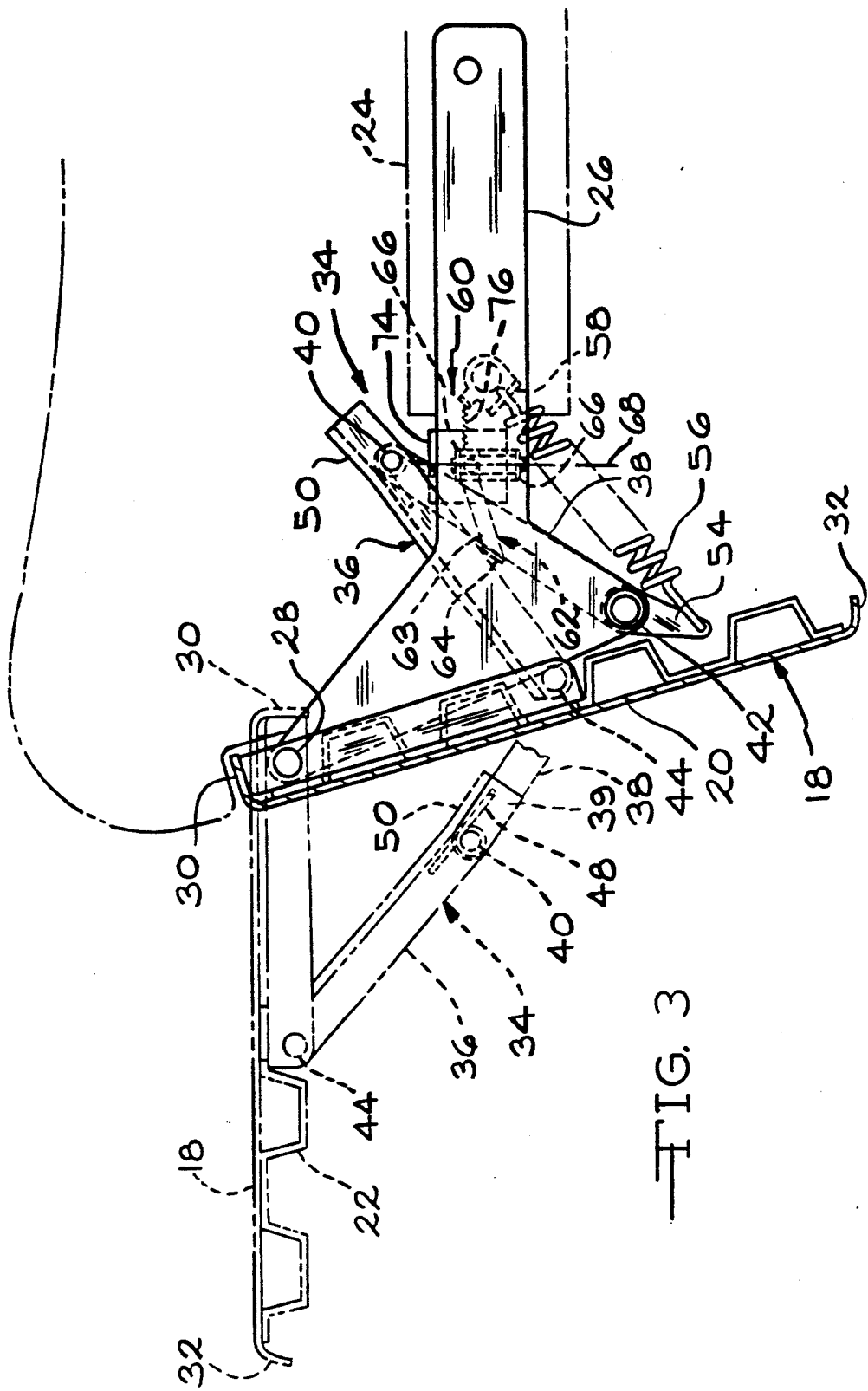
FIG. 3 is a side elevational view of the panel and structure for mounting the panel to the seat cushion.

The mechanism for mounting the panel to the front of the cushion and for deploying the panel is shown in FIG. 3. Seat cushion 12 has a frame 24 which includes bracket 26 mounted to the moving track structure (not shown) of the seat assembly. The panel 18 is stowed in a generally upright position at the front of the seat cushion and forms the front surface of the cushion. The panel 18 is coupled to the bracket 26 at a pivot joint 28 near the upper end 30 of the support panel 18. From the pivot joint 28, the panel extends downward to its lower end 32.

The panel 18 is made of molded plastic having a generally flat top wall or surface 20. The top wall is covered with upholstery (not shown) to match the seat assembly and vehicle interior. Beneath the top wall, the panel has a plurality of raised ribs 22 for strengthening the panel and to provide mounting bosses to attach the panel to the seat cushion. The panel can be made of other materials such as stamped steel if desired.

Figure 6:
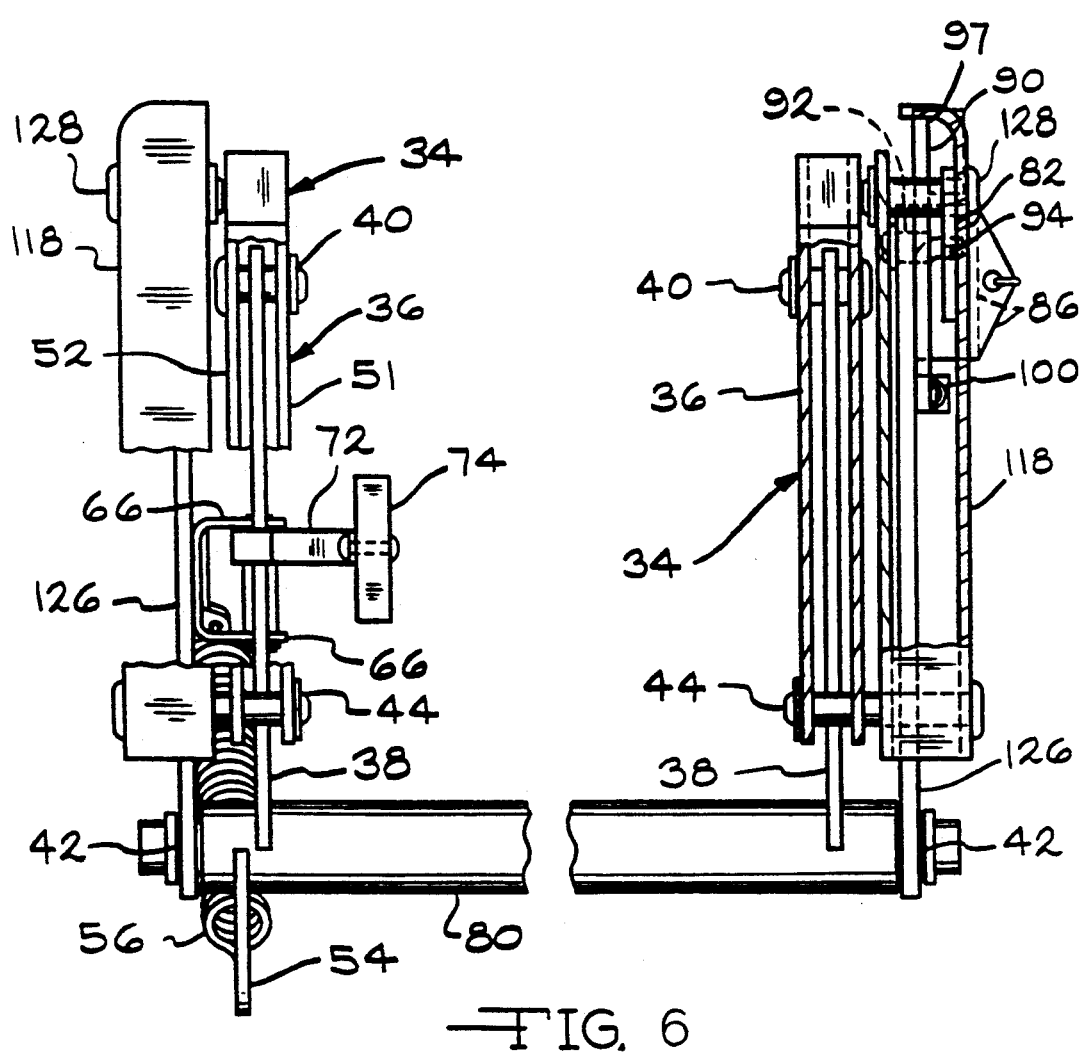
FIG. 6 is a front elevational view of the panel mounting and release mechanism of the present invention shown in FIG. 5 illustrating the interconnection between the two transverse sides of the seat assembly.

A pair of links, upper link 36 and lower link 38 form a folding brace 34 for supporting the panel 18 in the support position shown in phantom line in FIG. 3. The upper and lower links are joined together at a pivot joint 40 to enable the brace to fold. The lower link 38 is coupled to a torque tube 80 (FIG. 6). Torque tube 80 extends transversely of the seat cushion and is joined to the brackets 26 at each side of the cushion at a pivot joint 42. The upper link 36 is joined to the bottom of the panel 18 at a pivot joint 44. Pivot joint 44 is spaced forwardly from the pivot joint 28 to provide support to the panel in the extended position.

Upper link 36 has a U-shaped section with a closed end wall 50. The lower link 38 is positioned within the U-shaped section, between the side walls 51 and 52 of the U-shaped section (FIG. 6). When the panel 18 is in that stowed position, the brace 34 is folded at the pivot joint 40 with the two links 36 and 38 extending generally in the same direction from the pivot joint 40. As the panel is deployed and the brace 34 unfolded, the two links will rotate about joint 40 until the links extend in opposite directions from the joint 40 relative to one another as shown in phantom line in FIG. 3. The links rotate slightly beyond a straight line position to a position slightly over-center. In this over-center position, a downward load applied to the panel will act on the brace to urge continued rotation of the links away from the folded position. If desired, an over center spring 48 can be placed at the pivot joint 40 to ensure complete rotation to the over-center position.

The upper link extends slightly beyond the joint 40 toward the joint 42 forming an end portion 39. The top wall 50 of the end portion is inclined relative to the top wall of the remainder of the link 36 allowing the links to rotate to the over-center position. The top wall 50 serves as a stop to limit rotation to the deployed position. The over center spring 48 also functions to ensure that the brace remains in the unfolded or extended position by holding the flange 50 in contact with the lower brace 38. After deployment, the panel can be returned to its stowed position by applying a pressure to the brace in opposition to the spring 48 to fold the brace once again to its stowed position.

A lever 54 extends downwardly from the torque tube 80. A deployment spring 56 is connected to the lever 54 and to a tab 58 in the frame bracket 26 to apply a torque to the tube 80. The spring 56 provides the torque necessary to rotate the tube 80 in a counterclockwise direction about pivot joint 42, as viewed in FIG. 3, to unfold the brace 34 and deploy the panel. As the lower link is rotated, the pivot joint 40 moves forward, moving the upper link and panel forward.

A latch mechanism 60 is provided for engagement with the link 38 to oppose the spring 56 and retain the panel 18 in its stowed position until the desired deceleration acts on the seat assembly. The latch mechanism 60 includes an "L" shaped latching lever 62 having a pair of legs 63 and 72 extending from a pivot 70. The latching lever 62 is rotationally mounted to the bracket 26 through tabs 66 for rotation about the generally vertical axis 68. Latch leg 63 ends in a hook 64 engaging the front edge of the lower link 38 to resist rotation of the lower link necessary to deploy the panel.

Figure 4:
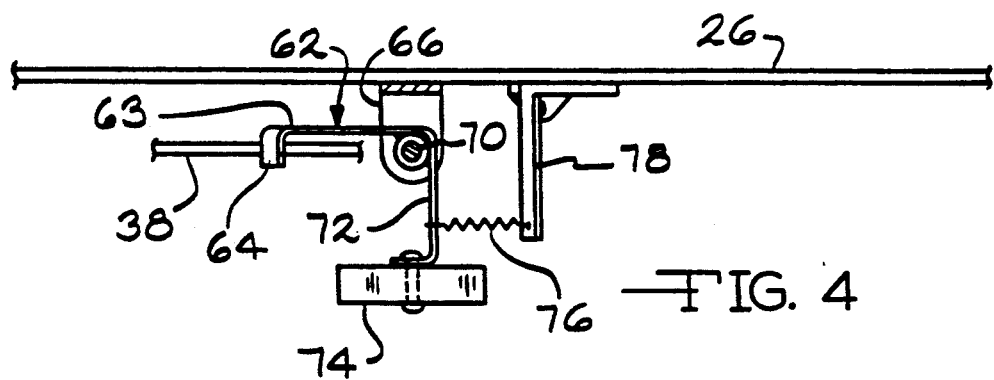
FIG. 4 is a top plan view of the inertia release latch for the panel.

The release leg 72 of the latching lever 62 extends transversely of the seat assembly to a weight 74. Since the release leg 72 extends transversely from the axis, when the vehicle experiences a deceleration, the inertia of the weight 74 will cause the entire latching lever to rotate clockwise as shown in the plan view of FIG. 4. This rotation releases the hook 64 from the edge of the lower link 38, enabling the spring 56 to rotate the lower link 38 and deploy the panel 18. To prevent inadvertent deployment caused by vehicle vibration etc., a spring 76 can be provided between the leg 72 and the bracket 26, through the tab 78, to resist rotation of the release lever 72. The spring 76 and weight 74 must be carefully calibrated to provide release of the panel when desired. A brace 34 is provided at both transverse sides of the seat assembly, as shown in FIG. 6. Torque tube 80 extends transversely of the seat assembly between the two braces 34 at each side of the seat assembly. Only one deployment spring 56 and latch mechanism 60 are used.

In the event a seat occupant is properly restrained by a seat belt, during a front impact collision the panel 18 will still be deployed. Since the occupant will not move forward as would occur without the occupant being restrained, the panel will slap the occupant on the calves but will not cause any significant injury.

Figure 5:
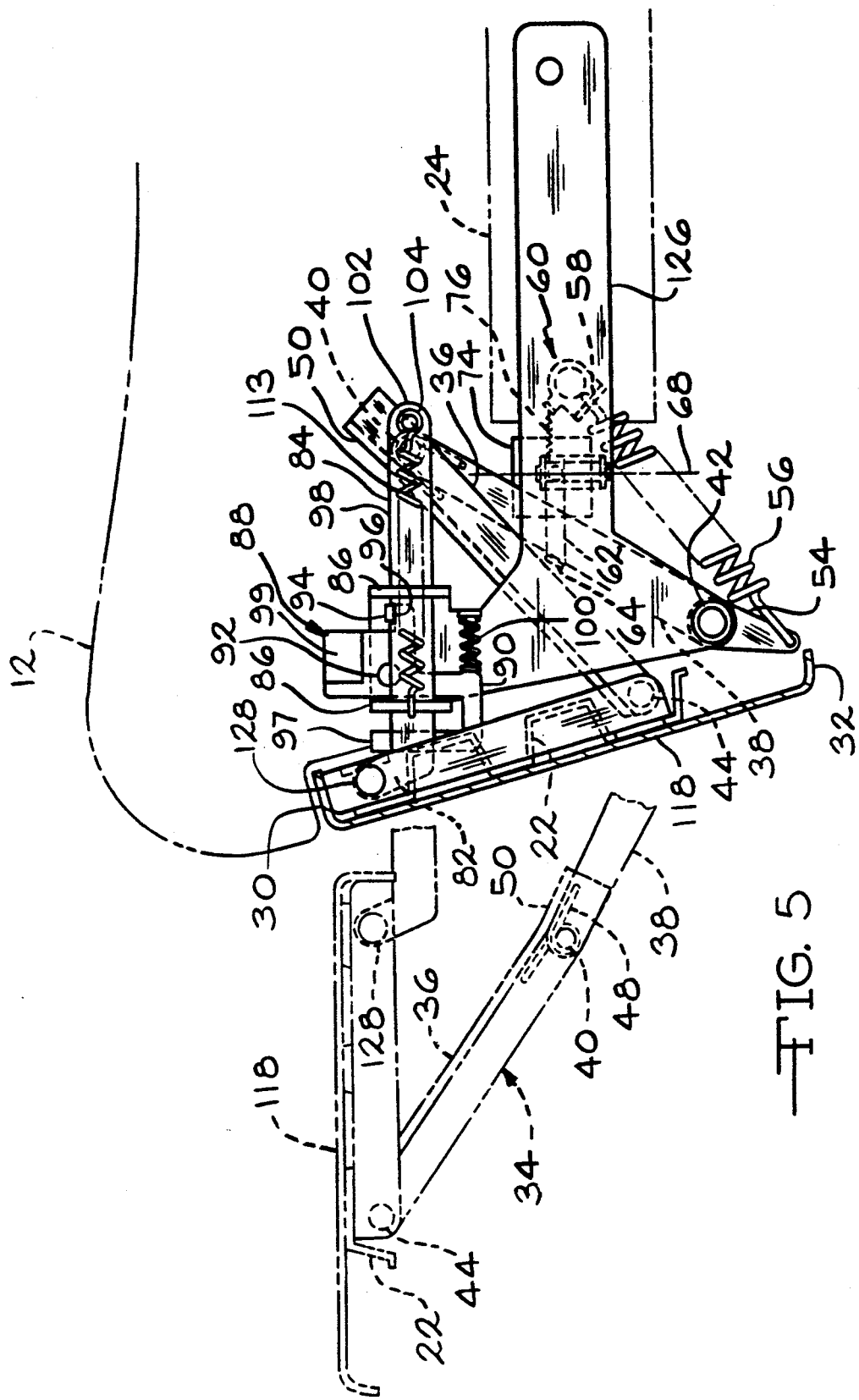
FIG. 5 is a side elevational view similar to FIG. 3 illustrating an alternative embodiment of the mounting for the panel.

The panel 18 can be made of a length, between the upper and lower ends 30 and 32, necessary to provide the needed extension forward from the front end 16 of the seat cushion. However, the maximum length of the panel may be limited by packaging constraints for the panel in the stowed position. Generally speaking, there will usually be sufficient room at the front of the seat cushion for a panel of the desired length. However, if the panel must be shorter than desired to provide access to the space below the seat cushion, e.g. for access to a storage drawer underneath the seat assembly, the panel may be mounted to the seat cushion for forward sliding motion in addition to rotation to the deployed position. With reference to FIG. 5, an alternative embodiment is shown which enables the pivot joint 28 that connects the panel to the seat cushion to be extended forward during deployment of the panel. In the alternative embodiment of FIG. 5 elements that are the same as in the embodiment of FIG. 3 are given the same reference numerals. Similar elements are given the same numerals with the addition of 100.

The braces, springs and latch mechanisms for deployment of the panel 118 are the same as for panel 18 of FIG. 3. Panel 118 is shorter in length between the upper end 30 and the lower end 32 to provide additional clearance below the panel when in the stowed position. However, to provide for the same effective length of the panel when in the deployed or support position, the pivot joint 128 is slidable relative to the seat cushion in a fore and aft direction. This enables the pivot joint 128 to move forward from the seat cushion when the panel is deployed. The pivot joint 128 is formed in a mounting boss portion 82 of a slide rail 84 that forms a part of the seat cushion frame. The side rail 84 is mounted to the bracket 126 through slots in lateral flanges 86.

To prevent the slide rail 84 from moving forward unintentionally, a latch 88 carried by the bracket 126 is provided to lock the slide rail in place. Latch 88 comprises a plate 90 attached to the bracket 126 for rotation about a pivot 92. The plate 90 has a laterally extending tab 94 which is seated into a notch 96 in the top edge 98 of the slide rail 84. A spring 100 can be provided between the plate and bracket 126 to bias the plate 90 so that the tab 94 is securely seated in the notch 96. A weight 99 can be added to the plate to bias the plate to a latched position during static conditions and also to provide an inertia force to rotate the plate to release the slide rail during deceleration of the seat assembly. Alternatively, the plate can be configured so that its center of gravity is concentric with the pivot joint 92 to eliminate inertia effects on the latch.

The plate 90 is equipped with a release tab 97 that is engaged by the panel 118 as it rotates about the pivot joint 128. This ensures that the latch 88 is released and the slide rail 84 allowed to move forward. The rearward end 102 of the slide rail 84 is equipped with a laterally extending stop 104 to prevent the slide rail from moving forward beyond the rearmost flange 86. To ensure that the slide rails do move forward, a tension spring 113 can be added between one flange 86 and stop 104.

The seat assembly of the present invention includes a front panel to protect vehicle passengers by preventing an unrestrained seat occupant from sliding forward beyond the front of the seat cushion and then falling downward to the vehicle floor. An unrestrained occupant that falls to the vehicle floor in front of the seat cushion is more likely to receive injuries than an occupant who remains on the seat cushion. The panel of this invention operates increase the effective length of the cushion by providing a support forward of the seat cushion.

It is to be understood that the invention is not limited to the exact construction illustrated and described above, but that various changes and modifications may be made without departing from the spirit and scope of the invention as defined in the following claims.

I claim:

1. A seat assembly for a vehicle comprising:
   a generally horizontal seat cushion having a frame and a front end; and
   support means mounted to said cushion for rotation from a stowed position to a generally horizontal support position in response to a predetermined deceleration of said seat assembly for vertically supporting a seat occupant who has moved forward off said seat cushion in response to said deceleration.

2. The seat assembly of claim 1 wherein said support means includes:
   a support panel having a generally upright stowed position at the front end of said cushion and having upper and lower ends in said stowed position;
   said frame including a mounting boss portion for mounting said support panel to said frame; and
   a first pivot joint mounting said support panel to said mounting boss portion of said frame adjacent the upper end of said panel for rotation of said panel about an axis extending transversely of said seat assembly adjacent said upper end whereby said panel is rotatable to said generally horizontal support position with said panel lower end positioned forward of said panel upper end.

3. The seat assembly of claim 2 wherein said support means includes bias means acting on said panel to urge said panel to said support position and latch means for holding said panel in said stowed position, said latch means including inertia release means for releasing said latch means in response to said predetermined deceleration to enable said bias means to rotate said panel to said support position.

4. The seat assembly of claim 2 further comprising means forming a brace connected to said support panel forward of said transversely extending axis and extending downwardly and rearwardly from said panel to said frame to support said panel in said support position.

5. The seat assembly of claim 4 wherein said brace is a folding brace having two links, an upper link and a lower link, each with two ends, a first end of said upper link being pivotally joined to said panel at a second pivot joint forward of said first pivot joint and a first end of said lower link being pivotally joined to said frame at a third pivot joint, second ends of said links being pivotally joined to one another at a fourth pivot joint, said brace being folded when said panel is in said stowed position with said links extending in generally the same direction from said fourth pivot joint and said brace being unfolded when said panel is rotated to said support position to form a substantially straight brace with said links extending in generally opposite directions from said fourth pivot joint.

6. The seat assembly of claim 5 wherein said support means includes bias means acting on one of said links to urge said panel to said support position and latch means engaging one of said links when said panel is in said stowed position to hold said panel in said stowed position in opposition to said bias means, said latch means having inertia release means for releasing said latch means in response to said predetermined deceleration to enable said bias means to rotate said panel to said support position.

7. The seat assembly of claim 5 wherein, as said brace is unfolded during deployment of said panel, said links rotate about said fourth pivot joint beyond a straight position in which said links each extend in opposite directions from said fourth pivot joint to an over-center position whereby downward loads on said panel act on said brace to continue rotation of said links about said fourth pivot joint from said folded position and further comprising stop means acting on said links for stopping rotation of said links in said over-center position whereby said panel can support vertically downward loads.

8. The seat assembly of claim 7 further comprising biasing means at said fourth pivot joint for urging said links toward said over-center position to prevent unintended rotation of said brace toward said folded position.

9. The seat assembly of claim 2 further comprising means for moving said mounting boss portion of said frame forward relative to the remainder of said frame upon rotation of said panel to said support position.

10. The seat assembly of claim 9 wherein said moving means includes at least one slide rail carried by said frame for fore and aft movement relative to said frame, said mounting boss portion being mounted to said at least on slide rail.

11. The seat assembly of claim 10 further comprising lock means on said at least one slide rail to prevent forward movement of said at least one slide rail in the absence of deployment of said panel to said support position.

12. The seat assembly of claim 11 wherein said lock means includes a locking lever rotationally mounted to said frame having a lock portion seated in a notch in said at least one slide rail, bias means for holding said lock portion in said notch and means for releasing said locking lever.

13. The seat assembly of claim 12 wherein said releasing means includes a release tab on said locking lever engagable with said panel as said panel is rotated to said support position.

14. The seat assembly of claim 12 wherein said releasing means includes weighting said locking lever to rotate to a release position in opposition to said biasing means in response to said predetermined deceleration.

15. A vehicle seat assembly comprising:
   a generally horizontal lower seat cushion having front and rear ends;
   a seat back extending upwardly from the rear end of said seat cushion;

a panel member mounted to the front end of said seat cushion for rotation about a horizontal axis transverse to said seat assembly, said panel member having a generally upright stowed position in which said panel member extends downwardly from said transverse axis forming a front surface of said seat cushion, said panel member being rotatable about said axis to a support position extending forwardly from the front end of said seat cushion;

means for rotating said panel member to said support position in response to a predetermined deceleration of said seat assembly; and means for holding said panel member in said support position and for supporting a seat occupant on said panel member.

16. The seat assembly of claim 15 further comprising retaining means for retaining said panel member in said stowed position.

17. The seat assembly of claim 16 wherein said retaining means includes an inertia latch release mechanism for releasing said retaining means when said seat assembly experiences said predetermined deceleration whereby said panel is rotated to said support portion by said means for rotating.

18. The seat assembly of claim 15 wherein said means for rotating said panel includes bias means acting on said panel member to urge said panel member to said support position.

19. A vehicle seat assembly comprising:
a generally horizontal lower seat cushion having front and rear ends;
a seat back extending upwardly from the rear end of said seat cushion;
a panel member mounted to said seat cushion having a stowed position at the front end of said seat cushion and being movable to a support position extending generally horizontally forward from the front end of said seat cushion;
means for moving said panel from said stowed position to said support position automatically in response to a predetermined deceleration acting upon said seat assembly; and
means for supporting said panel in said support position to support the weight of a seat occupant upon said panel.

20. The seat assembly of claim 19 wherein said panel is movably mounted to said seat cushion for rotation relative to said seat cushion about a horizontal axis extending transversely of said seat cushion.

21. The seat assembly of claim 19 wherein said support means includes a brace extending from said panel downwardly and rearwardly to said seat cushion.

* * * * *